US010057162B1

(12) United States Patent
Singh et al.

(10) Patent No.: US 10,057,162 B1
(45) Date of Patent: Aug. 21, 2018

(54) EXTENDING VIRTUAL ROUTING AND FORWARDING AT EDGE OF VRF-AWARE NETWORK

(71) Applicant: Amazon Technologies, Inc., Seattle, WA (US)

(72) Inventors: Bijendra Singh, Cedar Park, TX (US); Anand Narayan Acharya, Austin, TX (US); Himabindu Sajja, Austin, TX (US); Kenneth Patton, Bee Cave, TX (US)

(73) Assignee: Amazon Technologies, Inc., Seattle, WA (US)

( * ) Notice: Subject to any disclaimer, the term of this patent is extended or adjusted under 35 U.S.C. 154(b) by 52 days.

(21) Appl. No.: 15/194,472

(22) Filed: Jun. 27, 2016

(51) Int. Cl.
*H04L 12/28* (2006.01)
*H04L 12/721* (2013.01)
*H04L 12/713* (2013.01)
*H04L 12/741* (2013.01)
*H04L 29/06* (2006.01)
*H04L 29/12* (2006.01)
*H04L 12/46* (2006.01)

(52) U.S. Cl.
CPC .......... *H04L 45/66* (2013.01); *H04L 12/4633* (2013.01); *H04L 45/586* (2013.01); *H04L 45/745* (2013.01); *H04L 61/103* (2013.01); *H04L 69/22* (2013.01)

(58) Field of Classification Search
None
See application file for complete search history.

(56) References Cited

U.S. PATENT DOCUMENTS

| 9,860,169 | B1 | 1/2018 | Ninan et al. | |
|---|---|---|---|---|
| 2010/0080235 | A1* | 4/2010 | Yamate | H04L 45/00 370/395.31 |
| 2011/0032939 | A1* | 2/2011 | Nozaki | H04L 45/54 370/392 |
| 2011/0063992 | A1* | 3/2011 | Weng | H04L 12/4679 370/252 |

(Continued)

OTHER PUBLICATIONS

U.S. Appl. No. 15/194,457, filed Jun. 27, 2016, Titled: Extending Virtual Routing and Forwarding Using Source Identifers.

*Primary Examiner* — Phirin Sam
(74) *Attorney, Agent, or Firm* — Kilpatrick Townsend & Stockton LLP

(57) ABSTRACT

Systems, methods, apparatus and computer readable medium are disclosed for extending Virtual Routing and Forwarding (VRF) for a network. An example apparatus includes ports, memory and processing logic. The memory includes VRF routing tables corresponding to respective VRF domains. The memory may also include a list of media access control (MAC) addresses, wherein each MAC address in the list is linked to one of the respective VRF domains. The processing logic may be coupled to access the memory and coupled to the ports. The processing logic may be configured to receive an ingress packet at a port of the apparatus, identify a VRF domain that the ingress packet belongs to, process the ingress packet according to the VRF domain, and optionally generate an egress packet, by embedding/writing a MAC address in the egress packet that acts as a source identifier for the respective VRF domain.

20 Claims, 13 Drawing Sheets

(56) References Cited

U.S. PATENT DOCUMENTS

| | | | |
|---|---|---|---|
| 2012/0307628 A1* | 12/2012 | Maeda | H04L 12/417 370/225 |
| 2014/0056298 A1 | 2/2014 | Vobbilisetty et al. | |
| 2014/0140244 A1* | 5/2014 | Kapadia | H04L 61/103 370/255 |
| 2014/0195666 A1* | 7/2014 | Dumitriu | H04L 12/4625 709/223 |
| 2015/0222429 A1* | 8/2015 | Vilella | H04B 10/272 380/256 |
| 2016/0301655 A1* | 10/2016 | Lim | H04L 61/103 |
| 2017/0068700 A1* | 3/2017 | Sapa | G06F 17/30377 |
| 2017/0195210 A1* | 7/2017 | Jacob | H04L 12/4625 |
| 2017/0317919 A1 | 11/2017 | Fernando et al. | |
| 2017/0371806 A1* | 12/2017 | Ritchie | G06F 12/1072 |

\* cited by examiner

EXTENDING VIRTUAL ROUTING AND FORWARDING AT EDGE OF VRF-AWARE NETWORK

BACKGROUND

Consumers and businesses depend on networks for communication, data storage, and information gathering, for example. Internet Protocol (IP) is a communication protocol that is generally used to route packets from a source through different networks to the intended destination. An IP packet typically includes a packet header and a payload. The payload includes the information to be sent from the source to the destination and the packet header typically includes metadata required to route the packet. Routers forward and route the IP packets to transport the IP packets from their source to their destination. In a network that includes multiple routers, different entities may own and control different routers that are configured differently.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

This disclosure includes devices, systems, and methods of extending Virtual Routing and Forwarding (VRF) in a variety of networking contexts. In embodiments of the disclosure, packets can be routed according to VRF routing tables that are linked to physical addresses (e.g. MAC addresses) that are included in the packet. Routers at the edge of a network may receive a packet and identify a VRF domain that the packet belongs to. The router may then route the packet according to a routing table linked to the VRF domain. The router may also embed a physical address in the packet (e.g. a MAC address) by writing the physical address that is linked to a VRF domain as a source identifier of the egress packet. When the physical address that identifies a VRF domain is written to the packet, the packet will be referred to as a VRF aware packet, for the purposes of this disclosure.

When another router receives a VRF aware packet, the router can route the packet according to a VRF routing table of a VRF domain identified by the physical address. Packets that do not include a physical address for identifying a VRF routing table (VRF unaware packets) may be routed by a global VRF routing table associated with the global VRF domain. A router processing a packet in the global VRF domain may be considered as a traditional router performing the same functionality as if router is VRF unaware. Global VRF domain represents routing functionality in a router without any awareness of VRFs. So a VRF aware router may perform VRF-aware routing using VRF routing tables belonging to the respective VRF domains and the traditional routing functionality using global VRF domain. All routing pipeline and other resources that may not specifically be assigned to a specific VRF, may be assigned to the global VRF domain as a default configuration. In this way, a router can be configured to route VRF unaware packets conventionally by way of the global VRF routing table while routing VRF aware packets according to the VRF routing tables that may be stored in the router. This allows for the routers of a network to be updated or replaced one by one while still performing the conventional routing function of the router while also adding the capability to route VRF aware packets according to the embodiments of the disclosure.

Figure 1:
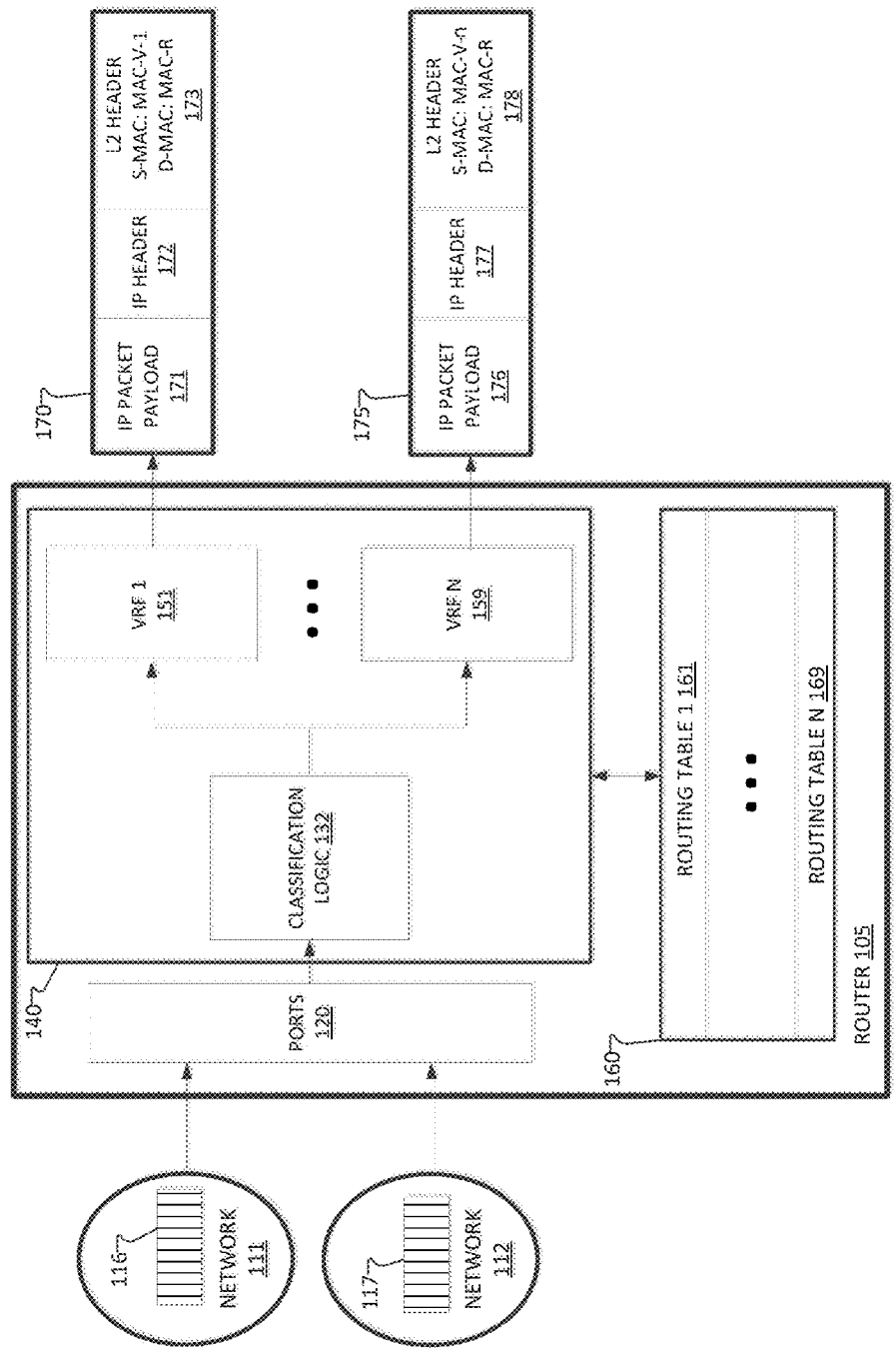
FIG. 1 illustrates an example router configured to add a physical address to packets for identifying a Virtual Routing and Forwarding (VRF) domain.

FIG. 1 includes an example router 105 for identifying VRF domains that incoming packets belong to and writing a physical address to the packets that identifies the VRF domain that the packet belongs to. In FIG. 1, router 105 includes ports 120, a memory 160, and processing logic 140. The ports are configured to send and receive network traffic. The ports may be Ethernet ports, for example. In the illustrated embodiment, network 111 is configured to send ingress packets 116 to router 105 via ports 120. Network 112 is configured to send ingress packets 117 to router 105 via ports 120. Packets 116 and 117 may be transmitted in an IP (Internet Protocol) format such as IPv4 (Internet Protocol version four) or IPv6 (Internet Protocol version six). Processing logic 140 is coupled to receive IP network traffic from the plurality of ports. Processing logic 140 may include processors, microprocessors, integrated circuits, systems-on-chip (SoCs), application-specific integrated circuits (ASICs), field-programmable gate arrays (FPGAs), or otherwise. Processing logic 140 can be configured to operate according to firmware and/or software instructions.

VRF is a technology that allows one physical router to route packets according to different routing tables. The different routing tables can be stored independently by one or more memories of the same physical router. The memory may be partitioned to separate the independent routing tables stored in the memory. Each VRF routing table corresponds to a respective VRF domain. In FIG. 1, the VRF routing tables are stored in memory 160, discussed in more detail below.

Traditionally, VRFs are identified by ranges in IP addresses. However, determining VRFs by IP addresses is inherently limiting as it requires that the IP addresses not overlap. In embodiments of the disclosure, VRFs are determined by source identifiers written to a packet rather than by IP addresses or other traditional methods. With the source identifier added to packets, each network element (e.g. router) can route the packets according to the VRF domain associated with the source identifier. This allows for the same or overlapping IP addresses being utilized by different VRFs without dedicating separate physical resources to each VRF to avoid IP address conflicts. Since each VRF can truly be implemented as a virtual slice of the physical resources of each network element, the network elements can scale dynamically rather than dedicating physical network resources to route each VRF or customer utilizing a network. The routing tables for different VRFs may change (grow or shrink) dynamically as more or less routes are added or subtracted to a network. By using shared physical resources of the same router (e.g. processing resources and memory resources) yet separating the routing table, routing of packets is virtualized into different VRFs. In this way, a VRF-aware network can be treated as one large "pool" network capacity which is not statically assigned to one specific VRF or one specific customer/entity. Therefore, the routers and ports included in a VRF-aware network can be dynamically allocated/deallocated on a per-VRF basis to accommodate the network demands for the different VRFs.

Referring again to FIG. 1, processing logic 140 receives packets from port(s) 120. Classification logic 132 within processing logic 140 may identify which VRF domain that each received packet belongs to. Router 105 may be positioned at an "edge" of a network where the router 105 is best positioned to identify which VRF that received packets belong to. Packet 116 is received by router 105 from network 111 and packet 117 is received by router 105 from network 112. In one embodiment, the VRF domain that a packet belongs to is identified by the port that the packet is received on. Classification logic 132 may also identify the VRF domain that the received packet belongs to by analyzing a VLAN identifier in the packet header, a source IP of the packet, a destination IP of the packet, an IP protocol, or otherwise.

Processing logic 140 may be configured to route the received ingress packets according to VRF routing tables linked to the identified VRF domains that the ingress packets belong to. In the illustrated embodiment, a packet that belongs to VRF 1 151 is routed according to VRF routing table 161, which is stored in memory 160 of router 105. Processing logic 140 is configured to read and write to memory 160. In the illustrated embodiment, memory 160 includes VRF routing tables corresponding to respective VRF domains. Memory 160 is partitioned to store each routing table independently, in one embodiment. Memory 160 includes routing tables 161 to 169, in the illustrated embodiment. Routing table 1 161 corresponds to VRF domain 1, while routing table N 169 corresponds to VRF N where N is an integer number. N can be an integer number between 0 and 65535, for example. In one example, the integer number N is 16. In one example, the integer number N is 64.

Processing logic 140 may also embed a source identifier for a VRF domain in the egress packet by writing a physical address (e.g. a MAC address) to the egress packet as a source identifier of the egress packet. Writing the physical address to the packet identifies the VRF domain that the packet belongs to and thus which VRF routing table that the packet should be routed with.

Figure 3:
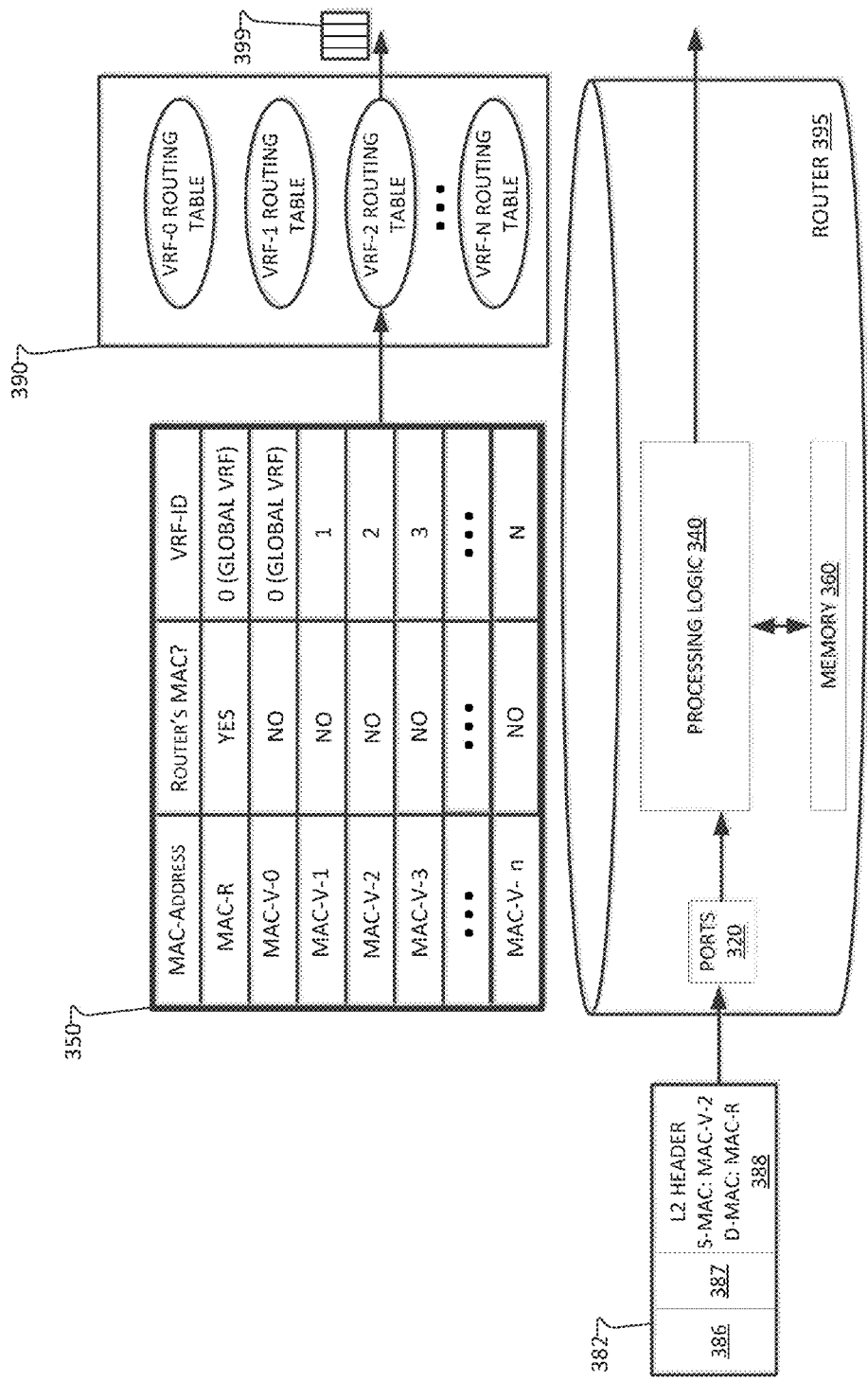
FIG. 3 illustrates an example router configured to route packets according to a Virtual Routing and Forwarding (VRF) domain identified by a physical address included in packets.

In the illustrated example, ingress packet 116 is received from network 111. Processing logic 140 (which includes classification logic 132) identifies the VRF domain that the packet belongs to with one or more of the described methods. In the illustrated embodiment, processing logic 140 identifies that packet 116 belongs to a first VRF domain, VRF 1 151, and routes the ingress packet 116 according to routing table 1 161 which corresponds to VRF 1 151. An egress packet 170 is generated by processing logic 140 by writing a matching physical address (which may be a MAC address) as a source identifier of the egress packet. The matching physical address is the physical address in a list that is linked to the identified VRF domain (VRF 1 151). Referring briefly to FIG. 3, an example list of MAC addresses is shown in the first column of table 350. All or a portion of table 350 may be included in memory 160 of router 105 to link different VRF domains to certain MAC addresses.

Packet 170 in FIG. 1 is transmitted by router 105 and includes an IP packet payload 171, IP header 172, and an L2 header 173. The L2 header 173 includes a source MAC address of MAC-V-1 and a destination MAC address of MAC-R. MAC-V-1 is the MAC address corresponding to VRF 1 151 since packet 116 was identified as belonging to VRF 1 151 and was routed according to the routing table 161 that corresponds to VRF 1 151. The MAC-V-1 address may have been written to the source MAC address of packet 170 by processing logic 140. Packet 175 in FIG. 1 is transmitted by router 105 and includes an IP packet payload 176, IP header 177, and L2 header 178. The L2 header 178 includes a source MAC address of MAC-V-n and a destination MAC address of MAC-R. In certain instances, MAC-R is the MAC address of the next-hop destination where the packet 175 is being sent, which could be a next-hop (or next closest) router. MAC-V-n is the MAC address corresponding to VRF N 159 since packet 116 was identified as belonging to VRF N 159 and was routed according to the routing table 169 that corresponds to VRF N 159. The MAC-V-n address may have been written to the source MAC address of packet 175 by processing logic 140. Although not illustrated, packets 170 and 175 may be transmitted through ports 120, which may be Ethernet ports.

Figure 2:
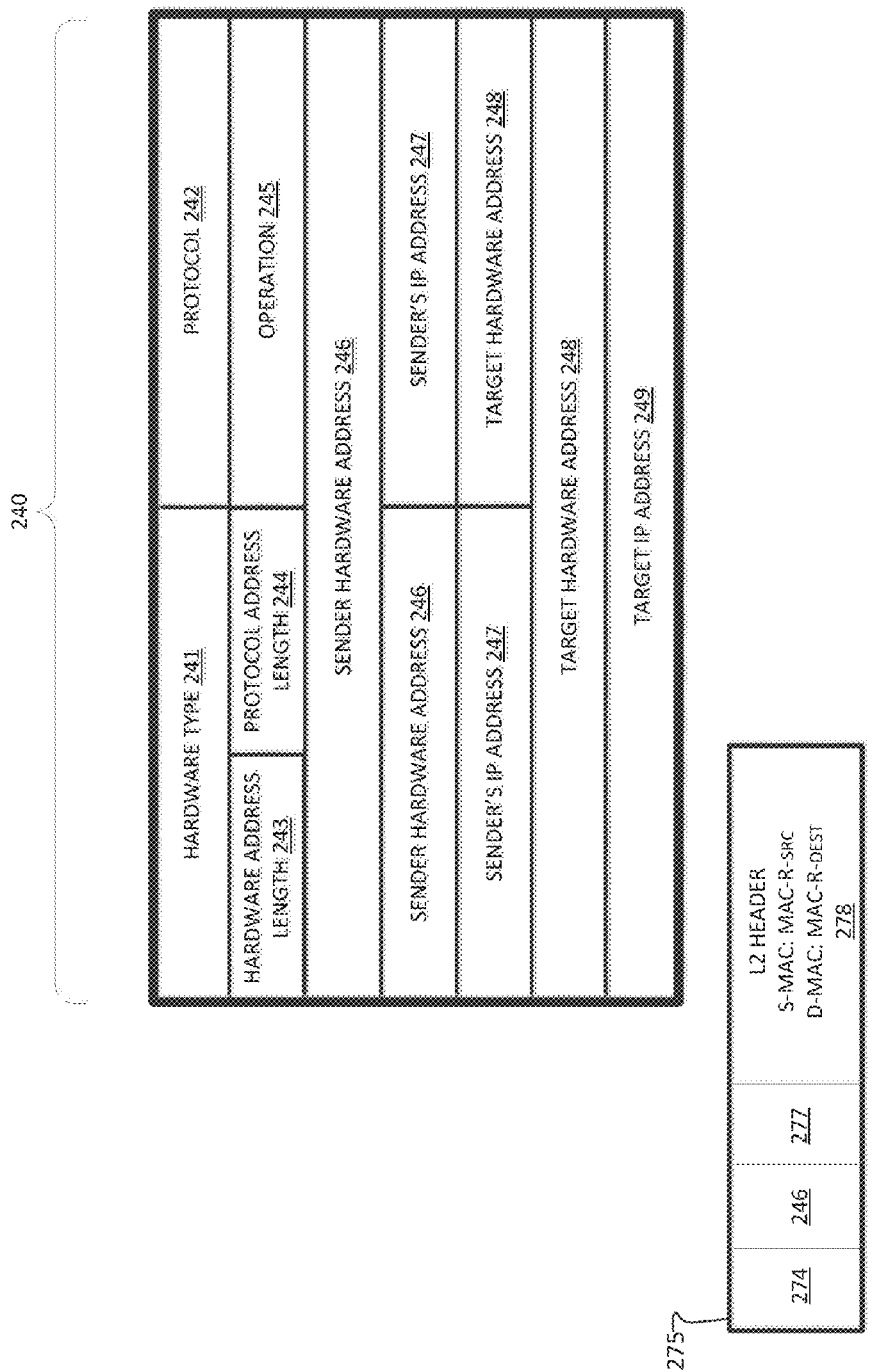
FIG. 2 illustrates an example Address Resolution Protocol (ARP) format and example packet that includes a physical address linked to a Virtual Routing and Forwarding (VRF) domain.

FIG. 2 illustrates an ARP (Address Resolution Protocol) format 240 that can be used in one embodiment of this disclosure. FIG. 1 illustrates processing logic 140 of router 105 writing a MAC address to the source MAC address of the L2 header 178 of packets 170 and 175 as the "source identifier." FIG. 2 illustrates that the "source identifier" corresponding with a given VRF can be written to the Sender Hardware Address (SHA) 246 of an ARP field such as in ARP format 240. In one embodiment, the SHA 246 has a field size of six octets. Hence, processing logic 140 in FIG.

1 can be configured to receive an ingress packet, identify which VRF domain that the ingress packet belongs to, process the packet based on the identified VRF domain.

In certain embodiments, the ingress packet 275 using the ARP format 240 is an ARP Packet. The processing logic 140 may have ARP-processing logic (not shown) for processing ARP packets. In certain implementations, the ingress packet 275 received at the router 105 is identified as an ARP Packet in the Ethertype of the Ethernet frame. Once the ingress packet 275 is identified as an ARP packet, according to aspects of the disclosure, the ARP-processing logic may inspect the SHA field 246 of the ARP packet to identify the corresponding VRF domain for the ARP packet. Once the corresponding VRF domain for the ARP packet is determined, the ARP packet may be processed by logic belonging to the VRF domain the ARP packet gets associated with based on the SHA field 246.

ARP requests and ARP replies are two examples of ARP packets. ARP requests are transmitted by the sender as broadcast packets. In certain implementations, the ARP requests have a destination MAC/L2 address of 0x0FFFFFFFFFFFF (12-Fs in hex representation) in the Layer 2 header. If the ARP request is received from a VRF-aware router, then the SHA field 246 may include a MAC address operating as a source identifier for a VRF domain. In the ARP request is received from a VRF-unaware router, the SHA will generally be the sending router's MAC address.

If the ARP packet 275 is an ARP reply (presumably in response to a received ARP request), the SHA field is used as the source identifier to identify the VRF domain and then the reply is consumed by the ARP processing logic belonging to that VRF domain.

If the router 105 is generating the ARP reply in response to a received ARP request, the ARP-processing logic generates the ARP reply by writing the SHA field 246 of the ARP reply with the MAC address identifying the VRF domain that the ARP request was associated with and writing the destination MAC address in the L2 header with the MAC address of the sender of the ARP request.

Packet 275 illustrates an example egress packet transmitted by router 105 where processing logic 140 was configured to write a matching MAC address to the SHA field of an ARP packet as the "source identifier" of that packet. Packet 275 includes a first ARP field 274, the SHA 246, a second ARP field 277, and L2 Header 278. L2 Header 278 includes a Source MAC Address and a Destination MAC address. For packets 170 and 175, the source MAC address in the L2 Header has been written to by processing logic 140 to denote the "source identifier," while packet 275 shows that processing logic 140 may write to the SHA field 246 of an ARP packet formatting to denote the "source identifier" corresponding to an identified VRF domain. As will be discussed below, the "source identifier" of packets received by VRF routers at the "core" of a network can be used to route those packets according to a VRF routing table that corresponds to the source identifier.

FIG. 3 illustrates an example router 395 configured to process packets according to a Virtual Routing and Forwarding (VRF) domain identified by a physical address included in packets. In certain embodiments, processing Internet Protocol (IP) packets, such as IPv4 and IPv6 packets to determine the next-hop destination, using VRF routing tables may be referred to as routing the packets. Router 395 is configured to route packets such as packets 170 and 175 where the source identifier is included in the source MAC address of Layer 2 Header 173/178. Router 395 may be placed in a "core" of a network rather than the "edge" of the network such that it may receive VRF aware packets that already have a source identifier (e.g. a source MAC address) written to the packets by a router such as router 105. Router 395 is also configured to route VRF unaware packets according to a global VRF routing table. In FIG. 3, router 395 receives packet 382 at ports 320. Packet 382 is formatted similarly to egress packets 170 and 175. Ports 320 may be similar to ports 120. Packet 382 includes a source MAC address of MAC-V-2 and a destination MAC address of MAC-R in L2 Header 388, where MAC-R is the L2/MAC address of the receiving router 395.

Router 395 includes processing logic 340 and memory 360 similar to processing logic 140 and memory 160. Memory 360 is partitioned to store each VRF routing table 390 independently, in one embodiment. Memory 360 also includes table 350 that includes MAC addresses linked to VRF domains. In the illustrated embodiment, table 350 is a MAC-to-ME table having a first column of MAC addresses and a third column of VRFs that are linked to the MAC addresses of the first column. In other words, a MAC address in the first row of the first column is linked to the VRF in the first row of the third column.

To illustrate, packet 382 is received on one of the ports 320. Packet 382 includes a packet payload 386, packet header 387, and L2 header 388. The source MAC address in L2 header 388 is MAC-V-2 and the destination MAC address is MAC-R, where MAC-R is the L2/MAC address of the receiving router 395. Processing logic 340 may validate that the destination address (MAC-R) of ingress packet 382 matches the MAC address of the router 395 before proceeding to routing packet 382. Column 2 of MAC-to-ME table 350 illustrates comparing the destination MAC address of header 388 to the network router's MAC address. Processing logic 340 analyzes the source MAC address of the packet 382, and when the source MAC address matches a physical address in the MAC-TO-ME table 350, processing logic 340 routes the packet according to a matched VRF routing table that is linked to the matching source MAC address. In FIG. 3, packet 382 is routed according to the VRF 2 routing table since the source MAC address (MAC-V-2) in column one of MAC-to-ME table 350 is linked to VRF 2 of the third column of MAC-to-ME table 350. After routing the packet, egress packet 399 is generated by processing logic 340 and transmitted onto a network. Egress packet 399 includes the routing information of VRF 2. Although not illustrated, egress packet 399 may be transmitted through ports 320. The destination L2 address for the egress packet 399 is the MAC address of the next-hop devices where these packets are being sent.

In the illustrated embodiment, processing logic 340 of router 395 routes packet 382 according to the VRF 2 routing table of table 390 since the source MAC address (MAC-V-2) in L2 header 388 is linked to VRF 2, according to MAC-to-ME table 350. However, when router 395 receives a packet having a source MAC address of MAC-V-1, processing logic 340 routes that packet according to the VRF 1 routing table since that source MAC address would match VRF 1. Furthermore, if the source MAC address in L2 header 388 of a received packet was MAC-V-0, processing logic 340 would route that packet according to a global VRF domain. If the destination MAC address in L2 header 388 of a received packet matches the MAC address of router 395, processing logic 340 may also route that packet according to a global VRF domain. This allows router 395 to be backwards compatible in that it can still route packets that are not VRF aware packets.

Figure 4:
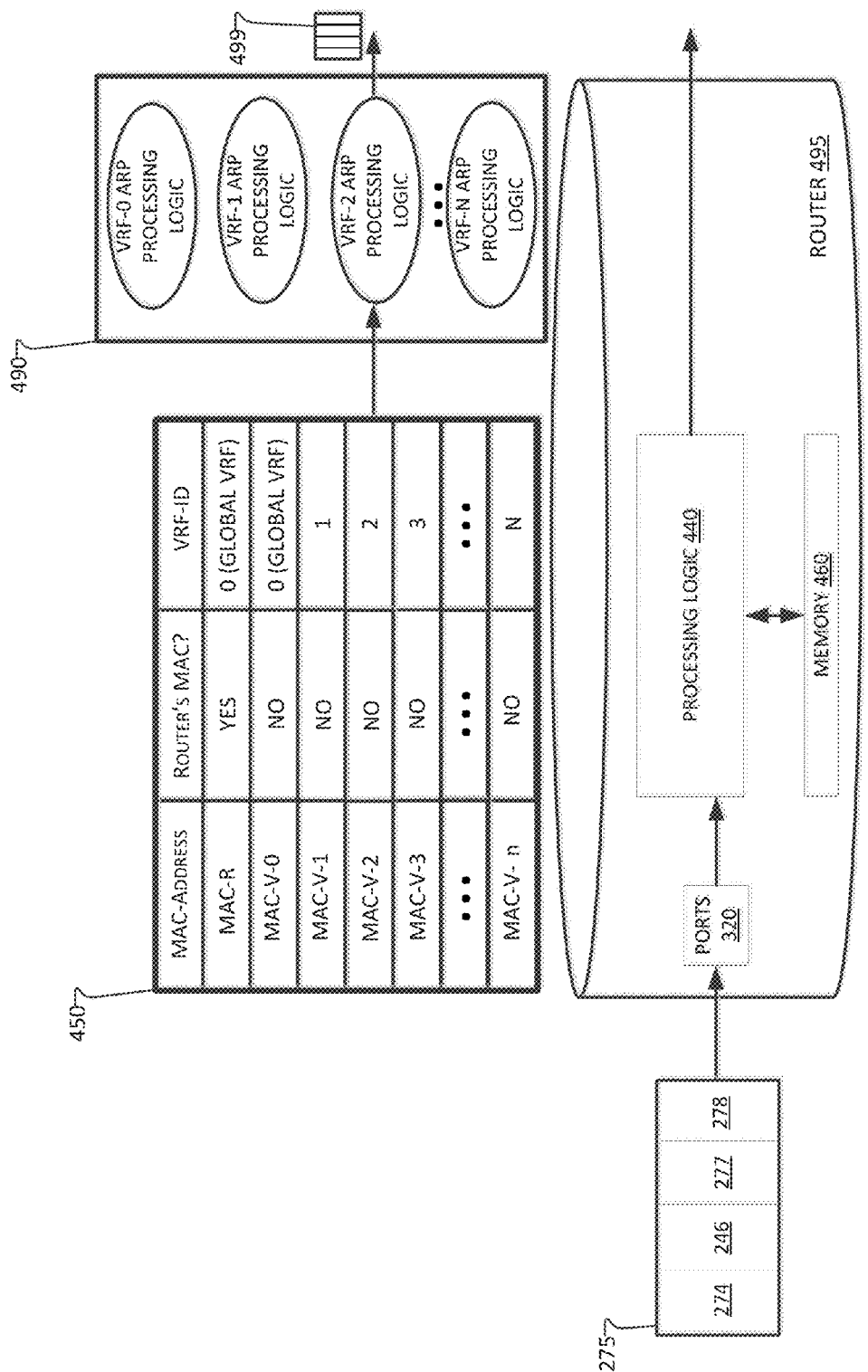
FIG. 4 illustrates an example router configured to route packets according to a Virtual Routing and Forwarding (VRF) domain identified by a physical address included in an ARP format of the packets.

FIG. 4 illustrates a router 495 that is configured similarly to router 395, but processing logic 440 of router 495 is configured to route packets, such as ARP packets, having the ARP formatting of example packet 275. To illustrate, packet 275 is received on one of the ports 320. Packet 275 includes a first ARP field 274, the SHA field 246, a second ARP field 277, and L2 Header 278. The SHA field 246 of packet 275 includes a physical address (e.g. a MAC address) as the "source identifier" corresponding to a VRF domain. Therefore, processing logic 440 is configured to identify a matching MAC address from column one of MAC-to-ME table 450 using the address in the SHA field 246. Once the matching MAC address is identified by analyzing SHA field 246, processing logic 440 processes packet 275 according to ARP processing logic linked to a respective VRF that is determined by matching source MAC address. Block 490 discloses ARP processing logic associated with each of the VRF domains residing at the router 495. ARP processing logic may be implemented using hardware, software, firmware or any combination thereof. Even though separate blocks are disclosed inside block 490 to disclose separate ARP processing logic associated with each VRF domain, in certain implementations, the same processing logic (or instantiations of the same processing logic) may be used with different configurations, rules or merely logical separation to process the ARP packets. Although not shown in FIG. 4, the memory for the router 495 may also include VRF routing tables (similar to the VRF tables discussed with reference to FIG. 3) associated with each of the VRF domains. In the illustrated embodiment, the SHA field 246 matches MAC-V-2 so packet 275 is processed according to the VRF-2 ARP processing logic. After processing an ARP packet, the processing logic 440 may transmit an ARP reply, onto a network as egress packet 499 or may simply consume the ARP packet to updates internal tables (and may not generate any new packet in response to it).

Figure 5:
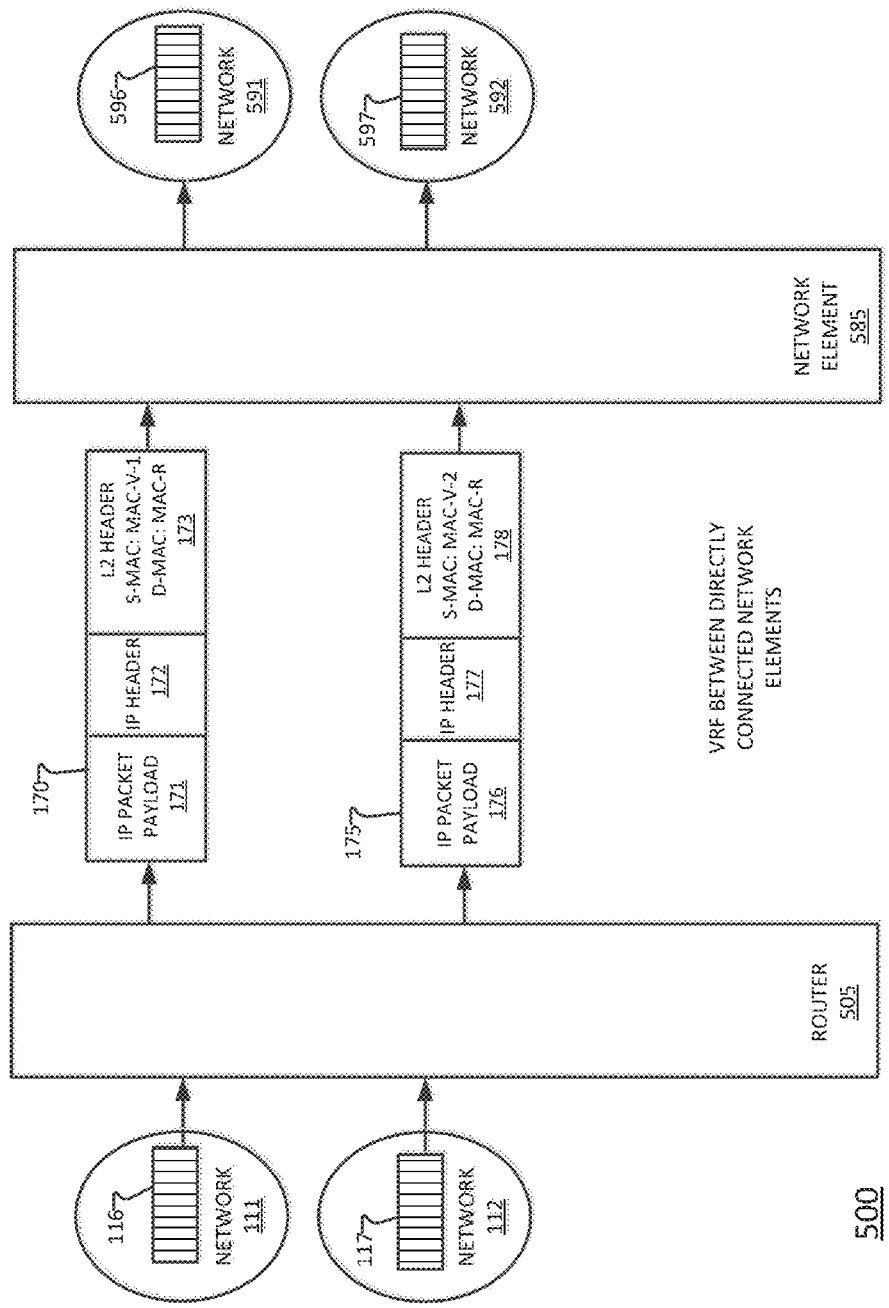
FIG. 5 illustrates a network system that extends a VRF between directly connected network elements.

FIG. 5 illustrates a network system 500 that extends a VRF between directly connected network elements. In FIG. 5, router 505 is included as an example network element. Network element 585 may be a router similar to router 395, in some embodiments. Router 505 may be considered to be on the "edge" of the illustrated network since packets 116 and 117 first enter the illustrated network at router 505. Network element 585 may be considered to be in a "core" of the illustrated network since at least some of the received packets (e.g. 170/175) are received from router 505 and those received packets include a source MAC address that is linked to a particular VRF domain and VRF routing table stored in router 505 and network element 585.

The router 505 may route packets 116 and 117 according to VRF routing tables corresponding to the source MAC address. Similarly to one disclosed implementation of router 105, router 505 may identify which VRF domain that packets 116 and 117 belong to and write a matching MAC address to a source MAC address in a Layer 2 Header of the packet as a "source identifier." In FIG. 5, router 505 and network element 585 are both "VRF aware" elements in that they are configured to route packets according to the VRF domain matched to a source MAC address. Each network element may include a memory that stores the routing tables that correspond to each of the different VRFs.

In FIG. 5, router 505 may route packet 116 coming from network 111 as packet 170. Packet 116 is routed by router 505 according to VRF 1 routing tables based on processing logic of router 505 identifying packet 116 as belonging to the VRF 1 domain. Network element 585 routes packet 170, which then egresses as packet 596 to network 591. Packet 170 is routed by network element 585 according to VRF 1 based on the source MAC address in L2 header 173 being linked to the VRF routing table for VRF 1. Thus, packet 116 is routed to network 591 entirely by routing tables corresponding to VRF 1. Also in FIG. 5, router 505 may route packet 117 coming from network 112, as packet 175. Packet 175 is routed by network element 585 as packet 597 to network 592. Packet 117 is routed by router 505 according to VRF 2 based on processing logic of router 505 identifying packet 117 as belonging to the VRF 2 domain. Packet 175 is routed by network element 585 according to VRF 2 based on the source MAC address (MAC-V-2 in the illustrated example) in L2 header 178 being linked to the VRF routing table for VRF 2. Thus, packet 117 is routed to network 592 entirely by routing tables corresponding to VRF 2.

Network system 500 is potentially advantageous in that packets 116 and 117 can be routed to networks 591 and 592, respectively, even though they are routed using the same physical router 505 and network element 585. This allows the network to logically start behaving as one big pool of network resources which can scale up or down based on demand for capacity. When the routing tables for VRF 1 grow because more routes are added in the network system 500, router 505 and network element 585 are able to allocate processing and memory resources to route IP packets having source MAC addresses that are linked to the VRF 1 domain. Similarly, when the routing table for VRF 2 grows because more routes are added in the network system, router 505 and network element 585 are able to allocate processing and memory resources to route IP packets having source MAC addresses that are linked to the VRF 1 domain. Hence, instead of dedicating separate network elements to route different VRFs, resources (e.g. ports and routers) from shared network elements can be allocated dynamically to meet the network demand associated with different VRFs (VRF 1 through VRF N). Of course, although only two VRFs are described in FIG. 5, there may be thousands of VRFs and associated networks coupled to router 505 and network elements 585.

Figure 6:
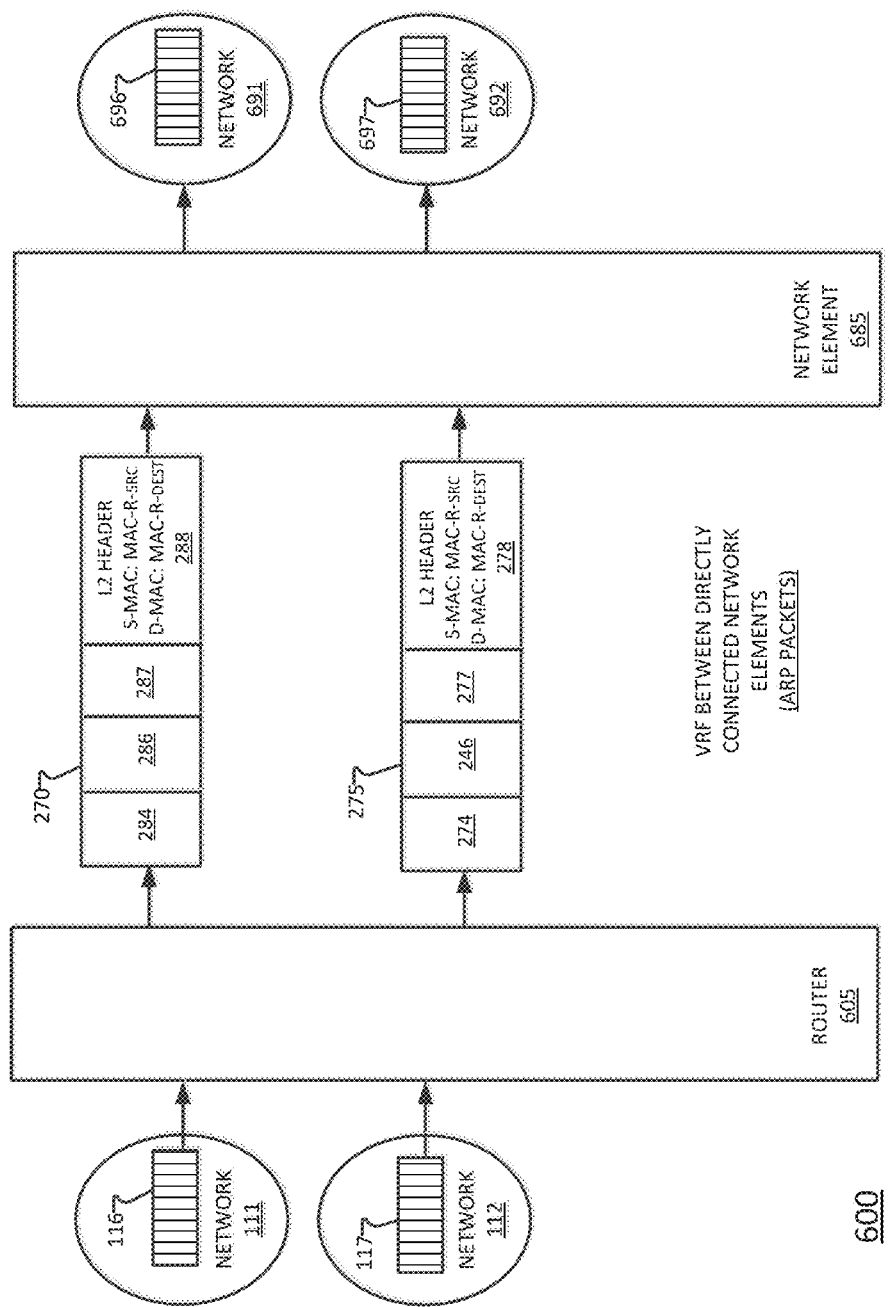
FIG. 6 also illustrates a network system that extends a VRF between directly connected network elements.

FIG. 6 illustrates a network system 600 that extends a VRF between directly connected network elements. In FIG. 6, router 605 is included as an example network element. Network element 685 may be a router similar to router 495, in some embodiments. Router 605 may be considered to be on the "edge" of the illustrated network since packets 116 and 117 first enter the illustrated network at router 605. Network element 685 may be considered to be in a "core" of the illustrated network since at least some of the received packets (e.g. 270/275) are received from router 605 and those received packets include a physical address (e.g. a MAC address) that is linked to a particular VRF domain and VRF routing table stored in router 605 and network element 685.

Similarly to the disclosed implementation of router 605 corresponding to the ARP format of FIG. 2, router 605 may identify which VRF domain that packets 116 and 117 belong to and the router 605 may then process the packets 116 and 117 according to VRF routing tables corresponding to the matching MAC address and write a matching MAC address to a SHA field of the packet as a "source identifier.". In FIG. 6, router 605 and network element 685 are both "VRF aware" elements in that they are configured to route packets according to the VRF domain matched to a physical address. Each network element may include a memory that stores the routing tables that correspond to each of the different VRFs.

In FIG. 6, router 605 may process packet 116 coming from network 111 as packet 270. Packet 270 includes a first ARP field 284, the SHA field 286, a second ARP field 287, and L2 Header 288. L2 Header 288 includes a Source MAC Address and a Destination MAC address. Packet 116 is processed by router 605 according to VRF 1 ARP packet processing logic for VRF 1 of router 605 due to identifying of packet 116 as belonging to the VRF 1 domain. Network element 685 processed packet 270, which then result in an egress packet 696 to network 691. Packet 270 is processed by network element 685 according to VRF 1 ARP processing logic based on the address (i.e., MAC address) in the SHA field 286 being linked to the VRF 1. Packet 116 may result in generation of a response ARP (also referred to as ARP reply) packet to network 691 entirely by ARP processing logic corresponding to VRF 1. Also in FIG. 6, router 605 may process packet 117 coming from network 112, which may result in transmission of ARP packet 275. Packet 275 includes a first ARP field 274, the SHA field 246, a second ARP field 277, and L2 Header 278. L2 Header 278 includes a Source MAC Address and a Destination MAC address. Packet 275 is processed by network element 685, which may result in transmission of packet 697 to network 692. Packet 117 is processed by router 605 according to VRF 2 ARP processing logic based on processing logic of router 605 identifying packet 117 as belonging to the VRF 2 domain. Packet 275 is processed by network element 685 according to VRF 2 ARP processing logic based on the address (i.e., MAC address) in the SHA field 246 being linked to the VRF routing table for VRF 2. Thus, packet 117 is processed entirely by ARP packet processing logic corresponding to VRF 2.

Network system 600 is potentially advantageous in that ARP packets 116 and 117 can be processed and potentially may result in transmission of new ARP packets to networks 691 and 692, respectively, even though they are processed by logically separate but physically shared ARP processing resources of router 605 and network element 685. When the routing tables for VRF 1 grow because more routes are added in the network system 600, the number of ARP packets will also likely grow requiring higher ARP packet processing capacity. The router 605 and network element 685 are able to allocate processing and memory resources to process higher number of ARP packets having SHA fields that are linked to the VRF 1 domain. Similarly, when the routing table for VRF 2 grows because more routes are added in the network system, the number of ARP packets will also likely grow requiring higher ARP packet processing capacity. The router 605 and network element 685 are able to allocate processing and memory resources to ARP packets having SHA fields that are linked to the VRF 2 domain. Hence, instead of dedicating separate network elements to route different VRFs, resources (e.g. ports and routers) from shared network elements can be allocated dynamically to meet the network demand associated with different VRFs (VRF 1 through VRF N). Of course, although only two VRFs are described in FIG. 6, there may be thousands of VRFs and associated networks coupled to router 605 and network elements 685

Figure 7:
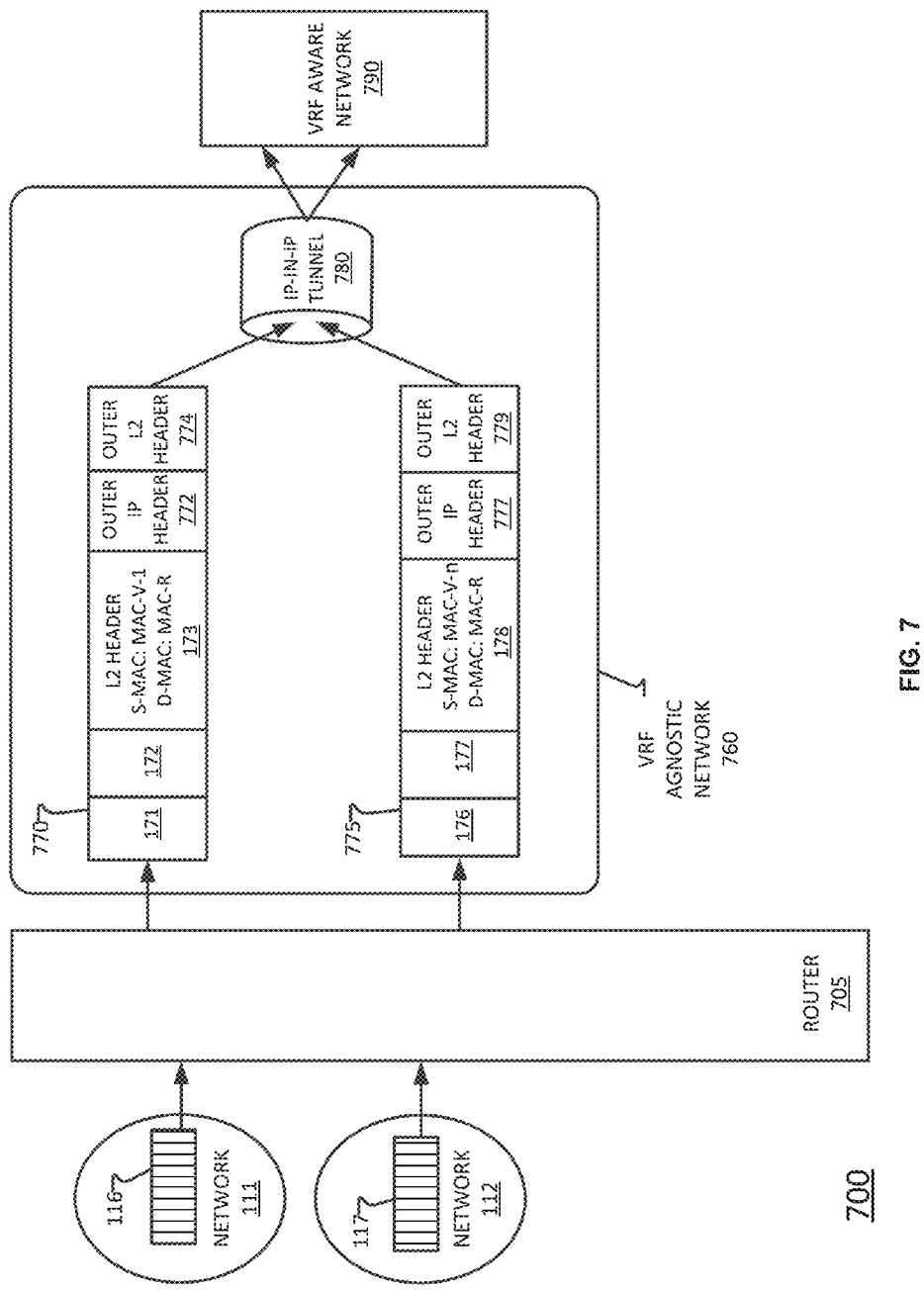
FIG. 7 illustrates an example network system that extends a VRF across geographically separate networks using a tunnel.

FIG. 7 illustrates an example network system 700 that extends a VRF across geographically separated networks. In FIG. 7, router 705 and network 790 are VRF aware networks in that they are configured to route packets according to routing tables indicated by a source identifier (e.g. source MAC address or MAC address in SHA field of ARP). In contrast, network 760 is a VRF agnostic network in that it is not configured to route packets according to the disclosed source identifiers. Network 760 may be a conventional network or a legacy network. Since network 760 is VRF agnostic, packets that include the source identifier are sent from VRF aware router 705 to VRF aware network 790 through VRF agnostic network 760 by way of an IP-in-IP tunnel 780. Router 705 and network 790 may be owned by a same entity while network 760 may be owned by a service provider or telecommunication utility.

Router 705 may be configured similarly to router 105. Router 705 may also be configured to encapsulate IP packets that include the source identifier within an IP tunneling packet format to send packets from networks 111 and 112 to network 790. To illustrate, packet 770 includes elements 171-173 of packet 170 as well as an outer IP header 772 and an outer L2 Header 774. Outer IP and L2 header 774 is formatted to transmit packet 770 through IP-in-IP tunnel 780 to network 790. Packet 775 includes elements 176-178 of packet 175 as well as an outer IP header 777 and an outer L2 Header 779. Outer IP and L2 header 779 is formatted to transmit packet 775 through IP-in-IP tunnel 780 to network 790. Packet 775 also includes IP packet payload 176, which was included in packet 117. Outer L2 Header 779 is formatted to transmit packet 775 through IP-in-IP tunnel 780 to network 790.

VRF aware network 790 may include a network element (e.g. a router) that receives packets 770 and 775. A network element of network 790 may strip the IP tunneling packet format (elements 772 and 774) from packet 770 so that packet 170 remains. IP packet payload 171 may then be forwarded by a network element of network 790 according to a routing table corresponding to a VRF domain linked to a matching source MAC address in L2 Header 173. Similarly, a network element of network 790 may strip the IP tunneling packet format from packet 775 so that packet 175 remains. IP packet payload 176 may then be forwarded by a network element of network 790 according to a routing table corresponding to a VRF domain linked to a matching source MAC address in L2 Header 178. Therefore, even when two VRF aware network elements are geographically separated by an intervening VRF agnostic network 760, writing a MAC address to the source MAC address field in the L2 Header can still be utilized when an IP tunnel is utilized to send the packets through the VRF agnostic network 760.

Figure 8:
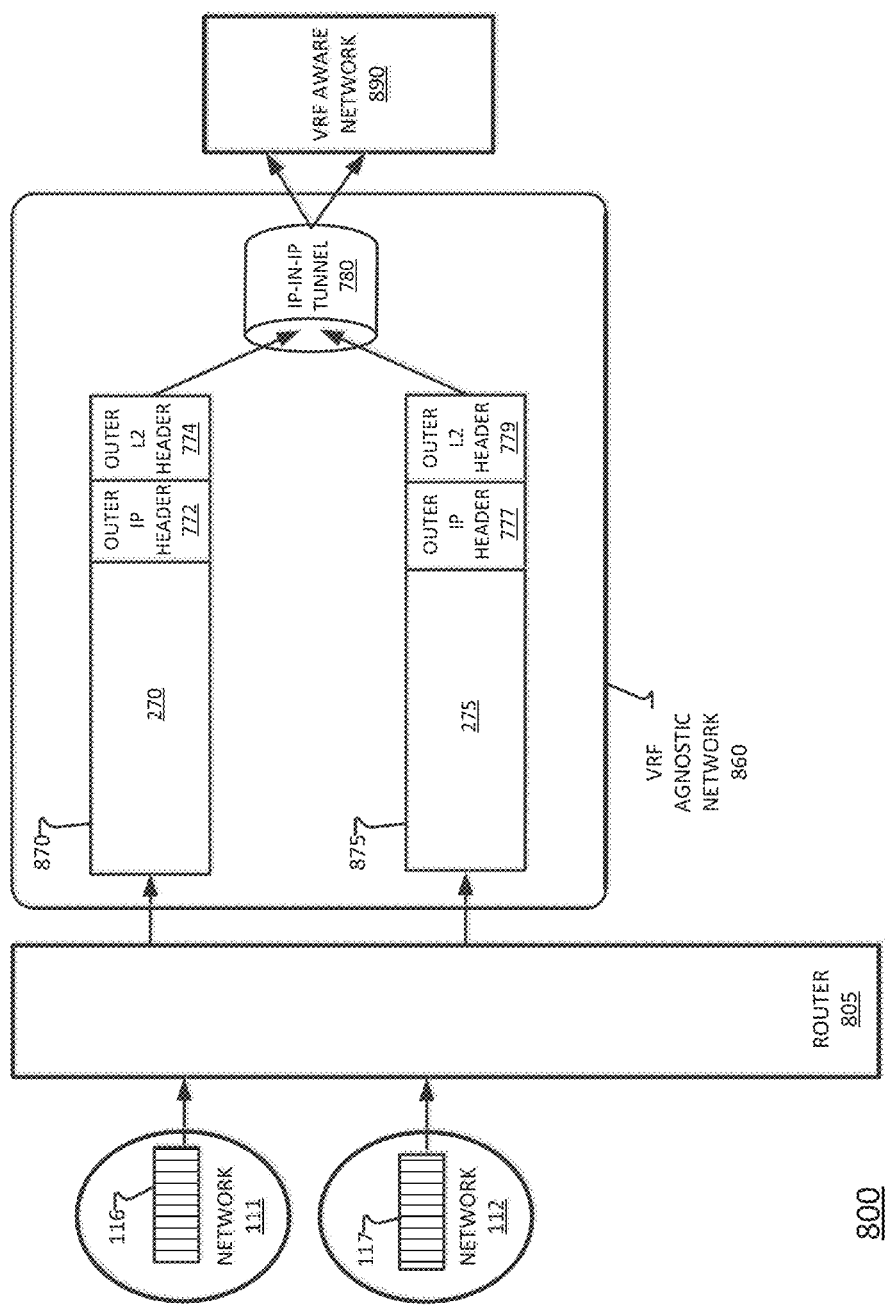
FIG. 8 also illustrates an example network system that extends a VRF across geographically separate networks using a tunnel.

FIG. 8 illustrates an example network system 800 that extends a VRF across geographically separated networks. Network system 800 operates similarly to network system 700 except that packets 170 and 175 are replaced with packets 270 and 275, respectively, in the IP-in-IP tunneling operation. As such, the "source identifier" in FIG. 8 is included in an SHA field of packets 270 and 275.

Figure 9:
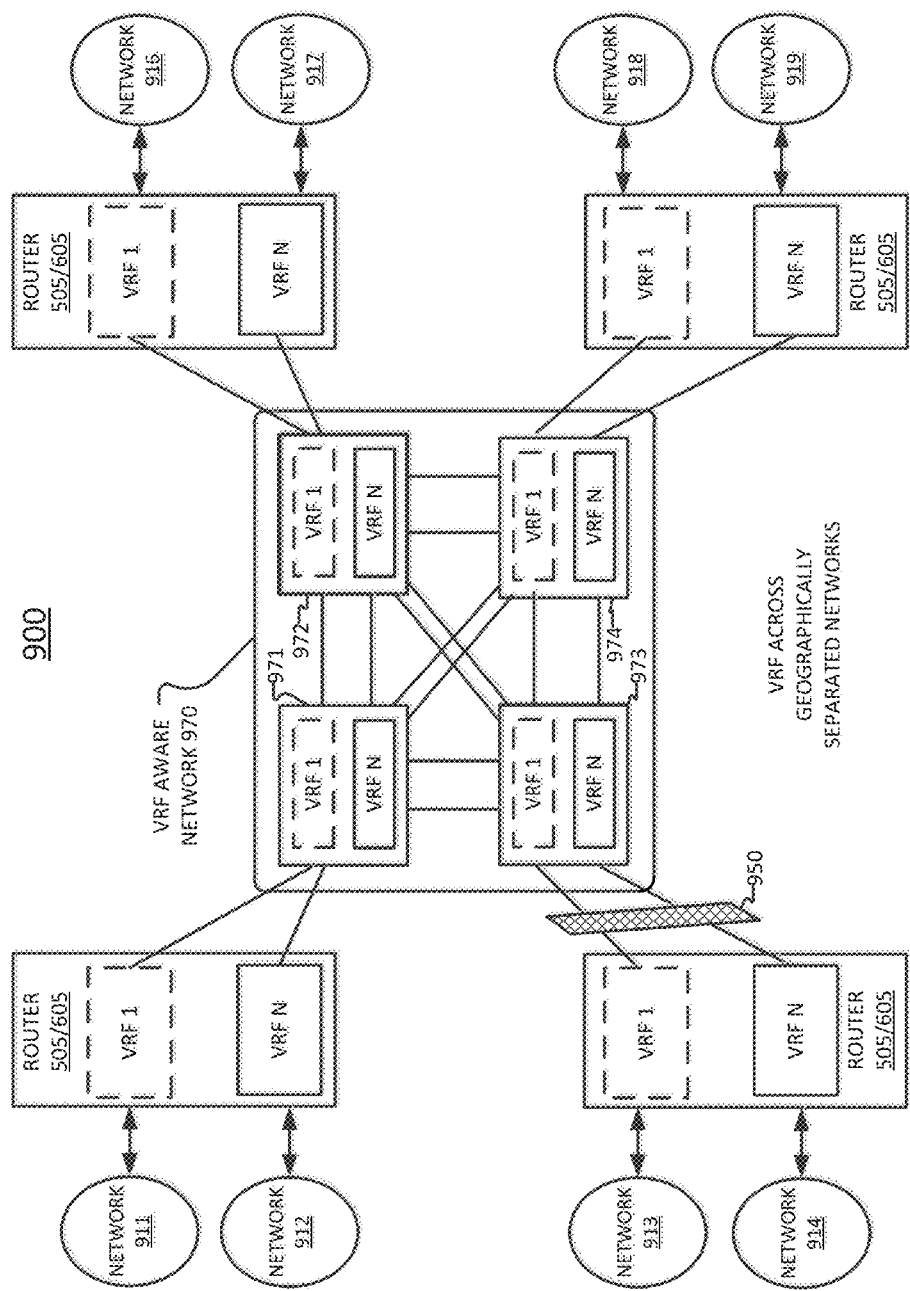
FIG. 9 illustrates another example of a network system that extends a VRF across geographically separated networks.

FIG. 9 illustrates a network system 900 for extending VRFs across geographically separated networks. In FIG. 9, networks 911, 913, 916, and 918 may be located in different cities. Networks 911, 913, 916, and 918 may be owned by a single entity (e.g. corporation or organization). Networks 912, 914, 917, and 919 may also be located in different cities. Networks 912, 914, 917, and 919 may be owned by a different entity than 911, 913, 916, and 918. In the illustrated embodiment, packets from networks 911, 913, 916, and 918 may be routed according to VRF 1 while packets from networks 912, 914, 917, and 919 may be routed according to VRF N. Packets received from networks 911, 913, 916, and 918 may be assigned a source identifier corresponding to VRF 1 by routers 505/605. Packets received from networks 912, 914, 917, and 919 may be assigned a source identifier corresponding to VRF N by routers 505/605.

VRF aware network 970 may be located in a location that is remote from the different cities. VRF aware network 970 may represent a data-center network or a service-provider network or a metro-Ethernet network, for example. VRF aware network 970 includes network elements 971, 972, 973, and 974 that are configured to route IP packets that include the disclosed source identifiers. As packets are transmitted between networks 911, 913, 916, and 918 via network system 900, they are routed according to VRF 1 as packets from networks 911, 913, 916, and 918 include the source identifier matched to VRF 1. As packets are transmitted between networks 912, 914, 917, and 919 via network system 900, they are routed according to VRF N as packets from networks 912, 914, 917, and 919 include the source identifier matched to VRF N. Routers 505/605 may be placed on the "edge" of a VRF-aware network that includes VRF aware network 970 and routers 505/605. As described in FIG. 9, routers 505/605 may receive packets from networks 911-919 that are not VRF aware and routers 505/605 may add the source identifier to received packets. FIG. 9 also includes IP-in-IP tunnel 950. Routers 505/605 may encapsulate IP packets similarly to routers 705/805 to tunnel the packets to network 970 via IP-in-IP tunnel 950.

In FIG. 7, FIG. 8 and FIG. 9, IP tunneling and IP-in-IP tunnels are discussed as illustrative examples of a tunneling technique. Other tunneling techniques, such as Generic Routing Encapsulation (GRE), Multiprotocol Label Switching (MPLS) or any other suitable tunneling technique may be used without deviating from the scope of the disclosure.

Figure 10:
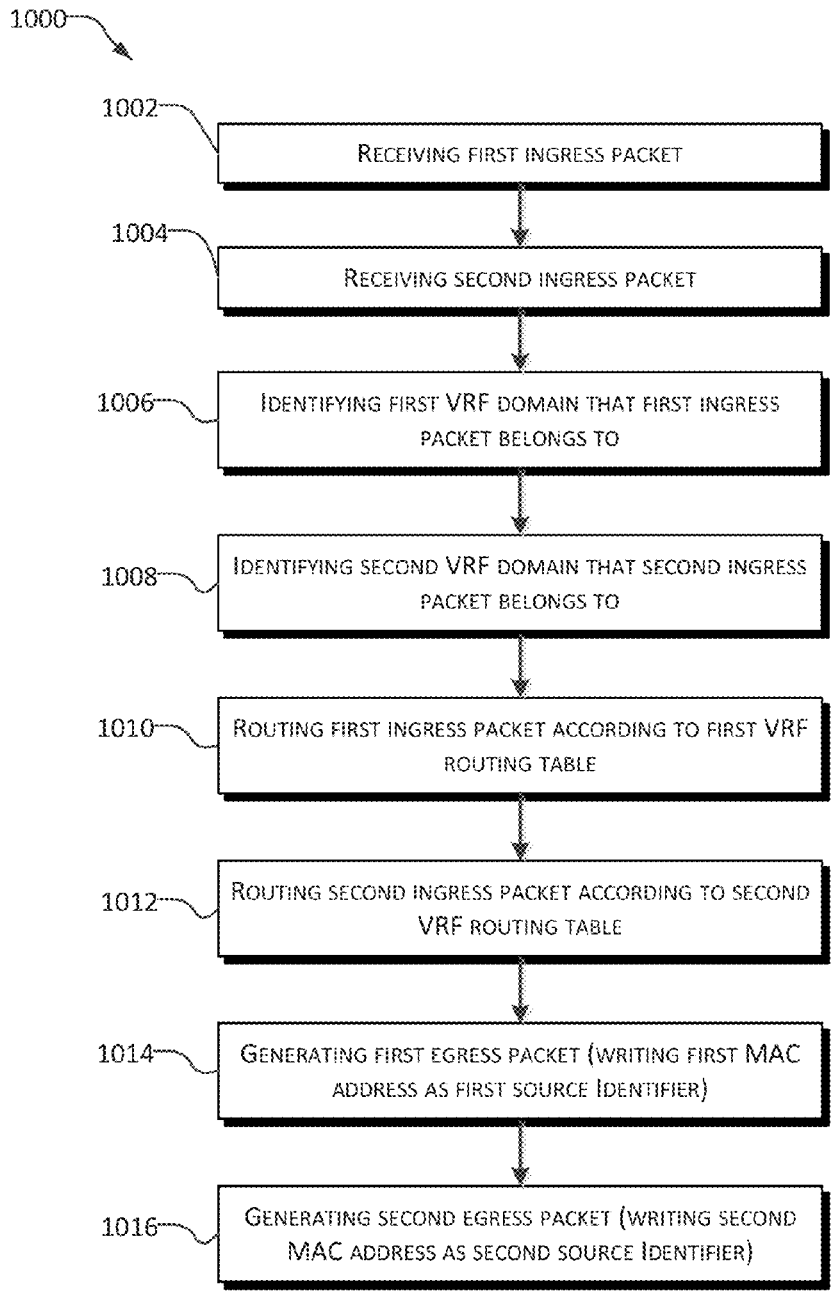
FIG. 10 depicts an illustrative flow chart demonstrating an example process for adding a physical address to a packet to identify a VRF domain.

FIG. 10 depicts an illustrative flow chart demonstrating an example process 1000 for adding a physical address to a packet to identify a VRF domain. The process 1000 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 1000 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 1000 of FIG. 10 may be performed by routers 105, 505, 605, 705, or 805. The code may be stored on a computer-readable storage medium, for example, in the form of a computer program including a plurality of instructions executable by one or more processors. The computer-readable storage medium may be non-transitory.

In process block 1002, a first ingress packet (e.g. packet 116) is received by a router (e.g. router 105). In process block 1004, a second ingress packet (e.g. packet 117) is received by the router. The router may be on the "edge" of a given network. In process block 1006, a first VRF domain identifies that the first ingress packet belongs to. A second VRF domain is identified that the second ingress packet belongs to in process block 1008. Identifying the VRF domains that each packet belongs to may be performed by classification logic 132 or a combination of processing logic 140 and classification logic 132. The VRF domain that a packet belongs to can be identified in a number of ways including analyzing a VLAN identifier in the packet header, a source IP of the packet, a destination IP of the packet, an IP protocol, the port that the packet is received on, or otherwise.

In process block 1010, the first ingress packet is routed according to a first VRF routing table that corresponds to the first VRF domain. The second ingress packet is routed according to a second VRF routing table that corresponds to the second VRF domain, in process block 1012. In process block 1014, a first egress packet is generated. Generating the first egress packet includes writing a first MAC address as a source identifier of the first ingress packet. In process block 1016, a second egress packet is generated. Generating the second egress packet includes writing a second MAC address as a source identifier of the second ingress packet. The first MAC address is linked to the first VRF domain and the second MAC address is linked to the second VRF domain. In one embodiment, writing the MAC addresses as the source identifier includes writing the MAC addresses to the source MAC address field in a Layer 2 header of the ingress packet. In one embodiment, writing the MAC addresses as the source identifier includes writing the MAC addresses to a Sender's Hardware Address (e.g. 246) of an ARP field of the ingress packet.

Figure 11:
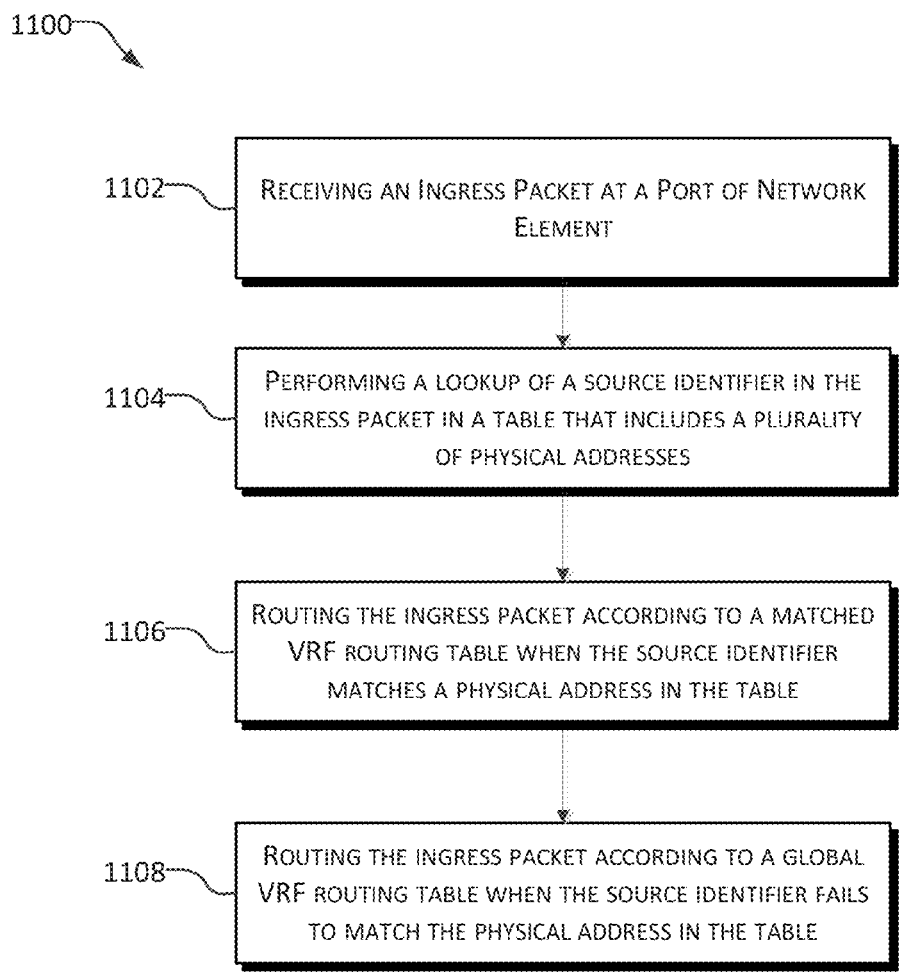
FIG. 11 depicts an illustrative flow chart demonstrating an example process for routing packets according to a physical address linked to a VRF domain.

FIG. 11 depicts an illustrative flow chart demonstrating an example process 1100 for routing packets according to a physical address linked to a VRF domain. The process 1100 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 1100 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 1100 of FIG. 11 may be performed by routers 395, 495, 585, or 685, 805, 971, 972, 973, or 974. The code may be stored on a computer-readable storage medium, for example, in the form of a computer program including a plurality of instructions executable by one or more processors. The computer-readable storage medium may be non-transitory.

In process block 1102, an ingress packet is received at a port (e.g. 320) of a network element (e.g. 395 or 495). A lookup of a source identifier in the ingress packet in a table (e.g. table 350/450) that includes a plurality of physical addresses is performed in process block 1104. In one embodiment, the source identifier is a physical address in a source MAC address field in a Layer 2 header of the ingress packet. In one embodiment, the source identifier is a physical address in a Sender's Hardware Address (e.g. 246) of an ARP field of the ingress packet.

The ingress packet is routed according to a matched VRF routing table when the source identifier matches one of the physical address in the plurality of physical address, in process block 1106. The matched VRF routing table is linked to the matching physical address. When the source identifier of the ingress packet fails to match any of the physical addresses of the plurality of physical addresses, the ingress packet is routed according to a global VRF routing table. The matched VRF routing tables and the global VRF routing table are stored in a memory of the network element.

In FIG. 3 for example, table 350 includes a plurality of physical address in column 1 of table 350. When the source identifier of an ingress packet is looked up in table 350 and matches one of the MAC addresses between MAC-V-1 and MAC-V-n in column 1, the ingress packet is routed according to the VRF routing table that is linked to the matching physical address. When the source identifier of the ingress packet is looked up in table 350 and doesn't match one of the MAC addresses between MAC-V-1 and MAC-V-n in column 1 of table 350, then it is routed according to a global VRF routing table, which may be the same as the routing table for VRF 0.

Figure 12:
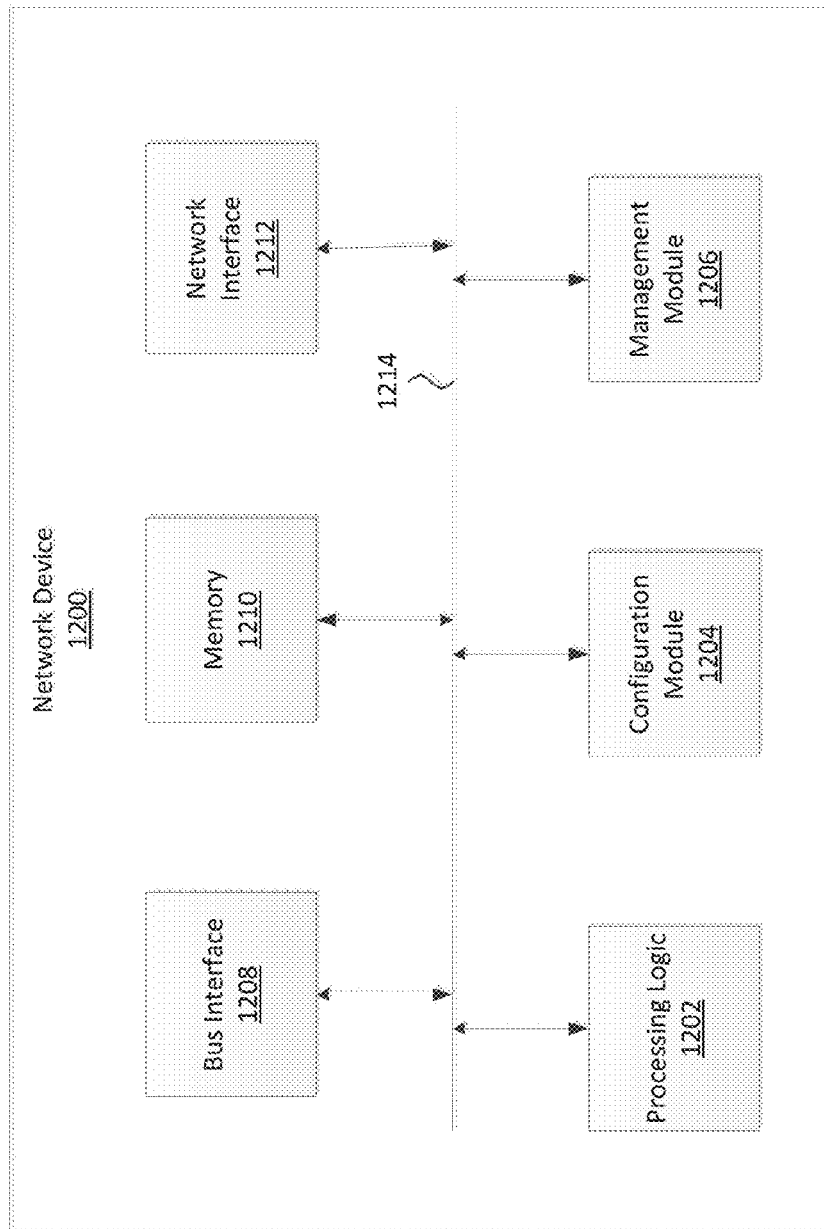
FIG. 12 illustrates an example of a network device, according to certain aspects of the disclosure.

FIG. 12 illustrates an example of a network device 1200. As disclosed herein, the network device may also be referred to as a network element. Functionality and/or several components of the network device 1200 may be used without limitation with other embodiments disclosed elsewhere in this disclosure, without limitations. A network device 1200 may facilitate processing of packets and/or forwarding of packets from the network device 1200 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 1200 may be the recipient and/or generator of packets. In some implementations, the network device 1200 may modify the contents of the packet before forwarding the packet to another device. The network device 1200 may be a peripheral device coupled to another computer device, a switch, a router or any other suitable device enabled for receiving and forwarding packets.

In one example, the network device 1200 may include processing logic 1202, a configuration module 1204, a management module 1206, a bus interface module 1208, memory 1210, and a network interface module 1212. These modules may be hardware modules, software modules, or a combination of hardware and software. In certain instances, modules may be interchangeably used with components or engines, without deviating from the scope of the disclosure. The network device 1200 may include additional modules, not illustrated here, such as components discussed with respect to the nodes disclosed in FIG. 13. In some implementations, the network device 1200 may include fewer modules. In some implementations, one or more of the modules may be combined into one module. One or more of the modules may be in communication with each other over a communication channel 1214. The communication channel 1214 may include one or more busses, meshes, matrices, fabrics, a combination of these communication channels, or some other suitable communication channel. Network element 585 and 685 and routers 105, 395, 495, 505, 605, 705, and 805 may include all or some of the modules of network device 1200.

The processing logic 1202 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1202 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1202 may be stored on a computer-readable storage medium, for example, in the form of a computer program. The computer-readable storage medium may be non-transitory. In some cases, the computer-readable medium may be part of the memory 1210.

The memory 1210 may include either volatile or non-volatile, or both volatile and non-volatile types of memory. The memory 1210 may, for example, include random access memory (RAM), read only memory (ROM), Electrically Erasable Programmable Read-Only Memory (EEPROM), flash memory, and/or some other suitable storage media. In some cases, some or all of the memory 1210 may be internal to the network device 1200, while in other cases some or all of the memory may be external to the network device 1200. The memory 1210 may store an operating system comprising executable instructions that, when executed by the processing logic 1202, provides the execution environment for executing instructions providing networking functionality for the network device 1200. The memory may also store and maintain several data structures and routing tables for facilitating the functionality of the network device 1200.

In some implementations, the configuration module 1204 may include one or more configuration registers. Configuration registers may control the operations of the network device 1200. In some implementations, one or more bits in the configuration register can represent certain capabilities of the network device 1200. Configuration registers may be programmed by instructions executing in the processing logic 1202, and/or by an external entity, such as a host device, an operating system executing on a host device, and/or a remote device. The configuration module 1204 may further include hardware and/or software that control the operations of the network device 1200.

In some implementations, the management module 1206 may be configured to manage different components of the network device 1200. In some cases, the management module 1206 may configure one or more bits in one or more configuration registers at power up, to enable or disable certain capabilities of the network device 1200. In certain implementations, the management module 1206 may use processing resources from the processing logic 1202. In other implementations, the management module 1206 may have processing logic similar to the processing logic 1202, but segmented away or implemented on a different power plane than the processing logic 1202.

The bus interface module 1208 may enable communication with external entities, such as a host device and/or other components in a computing system, over an external communication medium. The bus interface module 1208 may include a physical interface for connecting to a cable, socket, port, or other connection to the external communication medium. The bus interface module 1208 may further include hardware and/or software to manage incoming and outgoing transactions. The bus interface module 1208 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1208 may include the physical layer for any of these bus protocols, including a connector, power management, and error handling, among other things. In some implementations, the network device 1200 may include multiple bus interface modules for communicating with multiple external entities. These multiple bus interface modules may implement the same local bus protocol, different local bus protocols, or a combination of the same and different bus protocols.

The network interface module 1212 may include hardware and/or software for communicating with a network. This network interface module 1212 may, for example, include physical connectors or physical ports for wired connection to a network, and/or antennas for wireless communication to a network. The network interface module 1212 may further include hardware and/or software configured to implement a network protocol stack. The network interface module 1212 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 1200 may include multiple network interface modules, each configured to communicate with a different network. For example, in these implementations, the network device 1200 may include a network interface module for communicating with a wired Ethernet network, a wireless 802.11 network, a cellular network, an Infiniband network, etc.

The various components and modules of the network device 1200, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 13.

Figure 13:
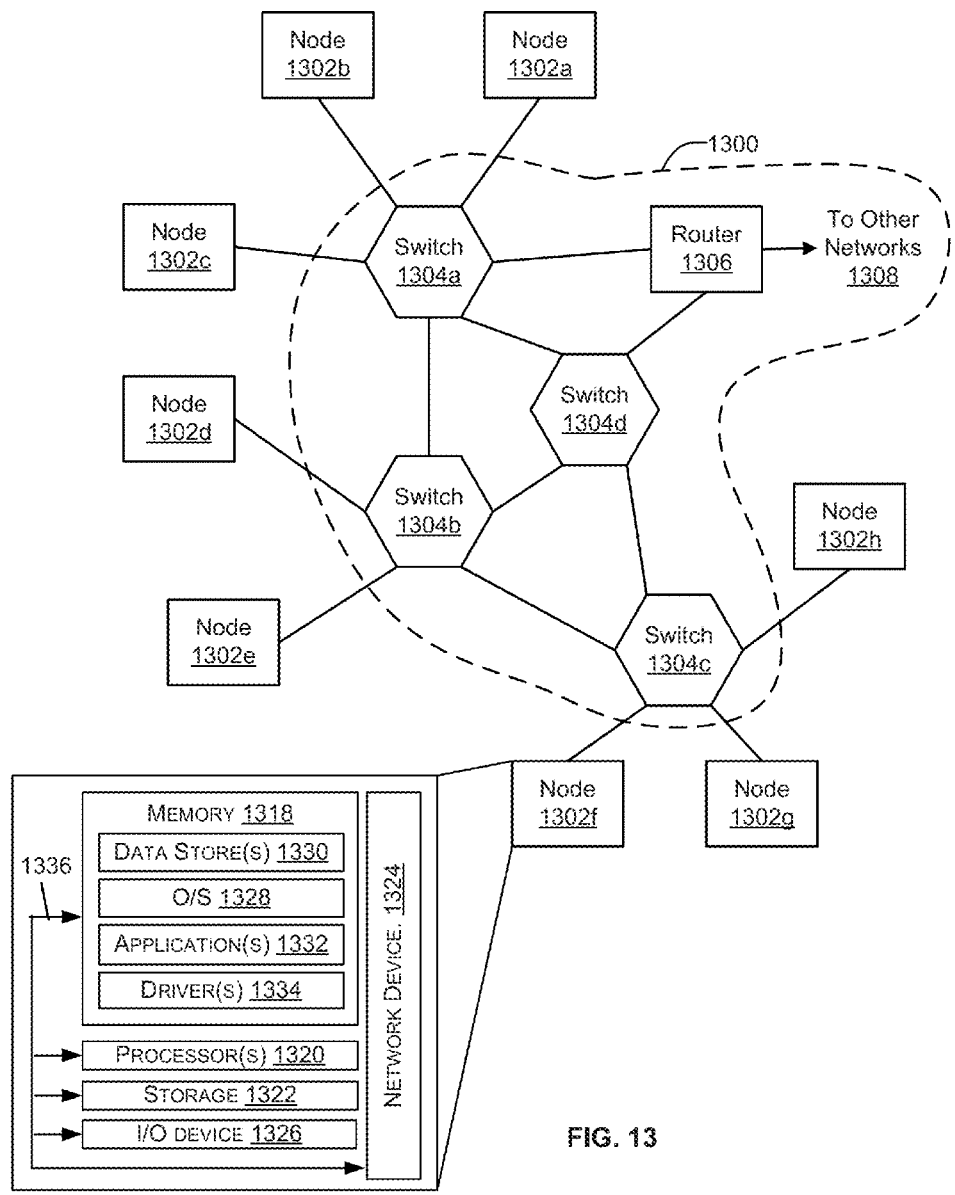
FIG. 13 illustrates an example architecture for features and systems described herein that includes one or more service provider computers and/or a user device connected via one or more networks, according to certain aspects of the disclosure.

FIG. 13 illustrates a network 1300, illustrating various different types of network devices 1200 of FIG. 12, such as nodes comprising the network device, switches and routers. In certain embodiments, the network 1300 may be based on a switched architecture with point-to-point links. As illustrated in FIG. 13, the network 1300 includes a plurality of switches 1304a-1304d, which may be arranged in a network. In some cases, the switches are arranged in a multi-layered network, such as a Clos network. A network device 1200 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1304a-1304d may be connected to a plurality of nodes 1302a-1302h and provide multiple paths between any two nodes.

The network 1300 may also include one or more network devices 1200 for connection with other networks 1308, such as other subnets, LANs, wide area networks (WANs), or the Internet, and may be referred to as routers 1306. Routers use headers and forwarding tables to determine the best path for forwarding the packets, and use protocols such as internet control message protocol (ICMP) to communicate with each other and configure the best route between any two devices.

In some examples, network(s) 1300 may include any one or a combination of many different types of networks, such as cable networks, the Internet, wireless networks, cellular networks and other private and/or public networks. Interconnected switches 1304a-1304d and router 1306, if present, may be referred to as a switch fabric, a fabric, a network fabric, or simply a network. In the context of a computer network, terms "fabric" and "network" may be used interchangeably herein.

Nodes 1302a-1302h may be any combination of host systems, processor nodes, storage subsystems, and I/O chassis that represent user devices, service provider computers or third party computers.

User devices may include computing devices to access an application 1332 (e.g., a web browser or mobile device application). In some aspects, the application 1332 may be hosted, managed, and/or provided by a computing resources service or service provider. The application 1332 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1308. Additionally, the user device(s) may be part of the distributed system managed by, controlled by, or otherwise part of the service provider computer(s) (e.g., a console device integrated with the service provider computers).

The node(s) of FIG. 13 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s)

may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1332 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1302a-1302h may include at least one memory 1318 and one or more processing units (or processor(s) 1320). The processor(s) 1320 may be implemented in hardware, computer-executable instructions, firmware, or combinations thereof. Computer-executable instruction or firmware implementations of the processor(s) 1320 may include computer-executable or machine-executable instructions written in any suitable programming language to perform the various functions described.

In some instances, the hardware processor(s) 1320 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1318 may store program instructions that are loadable and executable on the processor(s) 1320, as well as data generated during the execution of these programs. Depending on the configuration and type of the node(s) 1302a-1302h, the memory 1318 may be volatile (such as RAM) and/or non-volatile (such as ROM, flash memory, etc.). The memory 1318 may include an operating system 1328, one or more data stores 1330, one or more application programs 1332, one or more drivers 1334, and/or services for implementing the features disclosed herein.

The operating system 1328 may support nodes 1302a-1302h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1328 may also be a proprietary operating system.

The data stores 1330 may include permanent or transitory data used and/or operated on by the operating system 1328, application programs 1332, or drivers 1334. Examples of such data include web pages, video data, audio data, images, user data, and so on. The information in the data stores 1330 may, in some implementations, be provided over the network(s) 1308 to user devices 1304. In some cases, the data stores 1330 may additionally or alternatively include stored application programs and/or drivers. Alternatively or additionally, the data stores 1330 may store standard and/or proprietary software libraries, and/or standard and/or proprietary application user interface (API) libraries. Information stored in the data stores 1330 may be machine-readable object code, source code, interpreted code, or intermediate code.

The drivers 1334 include programs that may provide communication between components in a node. For example, some drivers 1334 may provide communication between the operating system 1328 and additional storage 1322, network device 1324, and/or I/O device 1326. Alternatively or additionally, some drivers 1334 may provide communication between application programs 1332 and the operating system 1328, and/or application programs 1332 and peripheral devices accessible to the service provider computer. In many cases, the drivers 1334 may include drivers that provide well-understood functionality (e.g., printer drivers, display drivers, hard disk drivers, Solid State Device drivers). In other cases, the drivers 1334 may provide proprietary or specialized functionality.

The service provider computer(s) or servers may also include additional storage 1322, which may include removable storage and/or non-removable storage. The additional storage 1322 may include magnetic storage, optical disks, solid state disks, flash memory, and/or tape storage. The additional storage 1322 may be housed in the same chassis as the node(s) 1302a-1302h or may be in an external enclosure. The memory 1318 and/or additional storage 1322 and their associated computer-readable media may provide non-volatile storage of computer-readable instructions, data structures, program modules, and other data for the computing devices. In some implementations, the memory 1318 may include multiple different types of memory, such as SRAM, DRAM, or ROM.

The memory 1318 and the additional storage 1322, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1318 and the additional storage 1322 are examples of computer storage media. Additional types of computer storage media that may be present in the node(s) 1302a-1302h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1302a-1302h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1302a-1302h may also include I/O device(s) 1326, such as a keyboard, a mouse, a pen, a voice input device, a touch input device, a display, speakers, a printer, and the like. The node(s) 1302a-1302h may also include one or more communication channels 1336. A communication channel 1336 may provide a medium over which the various components of the node(s) 1302a-1302h can communicate. The communication channel or channels 1336 may take the form of a bus, a ring, a switching fabric, or a network.

The node(s) 1302a-1302h may also contain network device(s) 1324 that allow the node(s) 1302a-1302h to communicate with a stored database, another computing device or server, user terminals and/or other devices on the network(s) 1300. The network device(s) 1324 of FIG. 13 may include similar components discussed with reference to the network device 1200 of FIG. 12.

In some implementations, the network device 1324 is a peripheral device, such as a PCI-based device. In these implementations, the network device 1324 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 1208 may implement NVMe, and the network device 1324 may be connected to a computing system using a PCIe interface.

A PCI-based device may include one or more functions. A "function" describes operations that may be provided by the network device 1324. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1324 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 12, FIG. 13, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A Virtual Routing and Forwarding (VRF) network router comprising:
   a plurality of Ethernet ports to send and receive network traffic;
   a memory including Virtual Routing and Forwarding (VRF) routing tables corresponding to respective VRF domains, the memory further including a MAC-to-ME table having a list of source media access control (MAC) addresses, wherein each source MAC address in the list is linked to one of the respective VRF domains; and
   processing logic coupled to the memory and coupled to the plurality of Ethernet ports, the processing logic configured to:
      receive an ingress packet on one of the Ethernet ports;
      identify, with classification logic within the processing logic, which of the VRF domains the ingress packet belongs to;
      route the ingress packet according to the VRF routing table corresponding to the identified VRF domain;
      generate an egress packet, wherein generating the egress packet includes writing a matching source MAC address as a source identifier of the identified VRF domain to the egress packet, and wherein the matching source MAC address is the source MAC address in the list that is linked to the identified VRF domain; and
      transmit the egress packet onto a network.

2. The VRF network router of claim 1, wherein the ingress packet is an Address Resolution Protocol (ARP) packet and the matching source MAC address is written to a Sender's Hardware Address (SHA) of an Address Resolution Protocol (ARP) field in the egress packet.

3. The VRF network router of claim 1, wherein the ingress packet is an Internet Protocol (IP) packet and the matching source MAC address is written to a source MAC address field in a Layer 2 Header of the egress packet.

4. The VRF network router of claim 1, wherein the ingress packet is an Internet Protocol (IP) packet.

5. An apparatus comprising:
   a plurality of ports to send and receive network traffic;
   a memory including Virtual Routing and Forwarding (VRF) routing tables for respective VRF domains, the memory further including a list of source media access control (MAC) addresses, wherein each source MAC address in the list is linked to one of the VRF domains; and
   processing logic coupled to access the memory and coupled to the plurality of ports, the processing logic configured to:
      receive an ingress Internet Protocol (IP) packet at one of the ports;
      identify a VRF domain that the ingress IP packet belongs to;
      route the ingress IP packet according to the VRF routing table for the identified VRF domain; and
      generate an egress IP packet, wherein generating the egress IP packet includes writing a matching source MAC address to a source MAC address field of a Layer 2 (L2) header of the egress IP packet, and wherein the matching source MAC address is the source MAC address in the list that is linked to the identified VRF domain.

6. The apparatus of claim 5, wherein the processing logic is further configured to:
   receive an Address Resolution Protocol (ARP) packet at one of the ports;
   identify a matching source MAC address in the list that matches a Sender's Hardware Address (SHA) of an ARP field of the ARP packet; and
   process the ARP packet according to the respective VRF domain associated with the matching source MAC address of the ARP packet.

7. The apparatus of claim 6, wherein the ARP packet is an ARP request, and wherein for processing the ARP packet the processing logic is further configured to:
   generate an ARP reply in response to the ARP request;
   write an SHA of an ARP field for the ARP reply with the matching source MAC address for the respective VRF domain;
   write a destination MAC address in a Layer 2 (L2) header of the ARP reply with a source MAC address of a L2 header of the ARP request; and
   transmit the ARP reply to the sender of the ARP request.

8. The apparatus of claim 5, wherein identifying the VRF domain includes analyzing a header of the ingress IP packet.

9. The apparatus of claim 5, wherein identifying the VRF domain includes analyzing the port the ingress IP packet was received on.

10. The apparatus of claim 5, wherein the ports include Ethernet ports.

11. The apparatus of claim 5, wherein the processing logic is further configured to:
   transmit, with one of the plurality of ports, the egress IP packet onto a network.

12. The apparatus of claim 5, wherein the apparatus includes a router.

13. A method comprising:
   receiving, by a router, a first ingress packet;
   receiving, by the router, a second ingress packet;
   identifying a first Virtual Routing and Forwarding (VRF) domain that the first ingress packet belongs to;
   identifying a second VRF domain that the second ingress packet belongs to;
   routing the first ingress packet according to a first VRF routing table for the first VRF domain;

routing the second ingress packet according to a second VRF routing table for the second VRF domain;

generating a first egress packet, wherein generating the first egress packet includes writing a first source MAC address as a first source identifier of the first VRF domain to the first egress packet; and generating a second egress packet, wherein generating the second egress packet includes writing a second source MAC address as a second source identifier of the second VRF domain to the second egress packet, the first source MAC address linked to the first VRF domain and the second source MAC address linked to the second VRF domain.

14. The method of claim 13, wherein the first source MAC address is written to a first Sender's Hardware Address (SHA) of a first Address Resolution Protocol (ARP) field in the first ingress packet, and wherein the second source MAC address is written to a second Sender's Hardware Address (SHA) of a second Address Resolution Protocol (ARP) field in the second ingress packet.

15. The method of claim 13, wherein the first source MAC address is written to a first source MAC address field in a first Layer 2 Header of the first egress packet and the second source MAC address is written to a second source MAC address field in a second Layer 2 Header of the second egress packet.

16. The method of claim 13, wherein identifying the first VRF domain includes analyzing which port the first ingress packet was received on.

17. The method of claim 13, wherein identifying the second VRF domain includes analyzing a source Internet Protocol (IP) address included in a header of the second ingress packet.

18. The method of claim 13 further comprising:

receiving, by the router, a third ingress packet; and routing the third ingress packet according to a global VRF routing table when the router is unable to identify a VRF domain for the third ingress packet.

19. The method of claim 13 further comprising:

transmitting the first egress packet onto a network; and transmitting the second egress packet onto the network.

20. The method of claim 13 further comprising:

encapsulating the first ingress packet within a tunneling packet format.

\* \* \* \* \*